(12) United States Patent
Mayers, Sr. et al.

(10) Patent No.: US 7,837,842 B1
(45) Date of Patent: Nov. 23, 2010

(54) HYDROGEN GENERATOR AND METHOD FOR THE PRODUCTION OF HYDROGEN

(76) Inventors: Fred T. Mayers, Sr., P.O. Box 9405, Chester, VA (US) 23831; Fred T. Mayers, Jr., P.O. Box 9405, Chester, VA (US) 23831

( * ) Notice: Subject to any disclaimer, the term of this patent is extended or adjusted under 35 U.S.C. 154(b) by 0 days.

(21) Appl. No.: 12/584,617

(22) Filed: Sep. 9, 2009

(51) Int. Cl.
C25B 9/10 (2006.01)
C25B 1/04 (2006.01)

(52) U.S. Cl. .................. 204/266; 204/260; 204/265; 205/628; 205/637

(58) Field of Classification Search .......... 205/628, 205/637; 204/260, 265, 266
See application file for complete search history.

(56) References Cited

U.S. PATENT DOCUMENTS

| | | | |
|---|---|---|---|
| 4,256,060 A | 3/1981 | Kelly | |
| 4,389,466 A * | 6/1983 | Joy | .......... 429/404 |
| 4,597,363 A | 7/1986 | Emelock | |
| 5,231,954 A | 8/1993 | Stowe | |
| 6,209,493 B1 | 4/2001 | Ross | |
| 7,191,737 B2 | 3/2007 | Klein | |
| 2001/0050234 A1 * | 12/2001 | Shiepe | .......... 205/629 |

\* cited by examiner

*Primary Examiner*—Alexa D. Neckel
*Assistant Examiner*—Nicolas A. Smith

(57) ABSTRACT

An apparatus and method for generating hydrogen. The hydrogen generator includes a cylindrical body and two end plates defining a cavity therein. A plurality of elements are disposed within the cavity including an outer and inner gaskets, an outer and inner electrodes, and a proton exchange membrane. A bladder inflated within the cavity compresses the elements together and into firm contact with the inner wall of the body. A plurality of elongated bolts compresses the end plates against the ends of the cylindrical body. The hydrogen generator includes a water inlet port, an oxygen and water outlet port, and a hydrogen port extending. Connecting a DC voltage across the electrodes and pumping distilled water into the water inlet port produces hydrogen gas that can be used to fuel an internal combustion engine or a fuel cell.

20 Claims, 9 Drawing Sheets

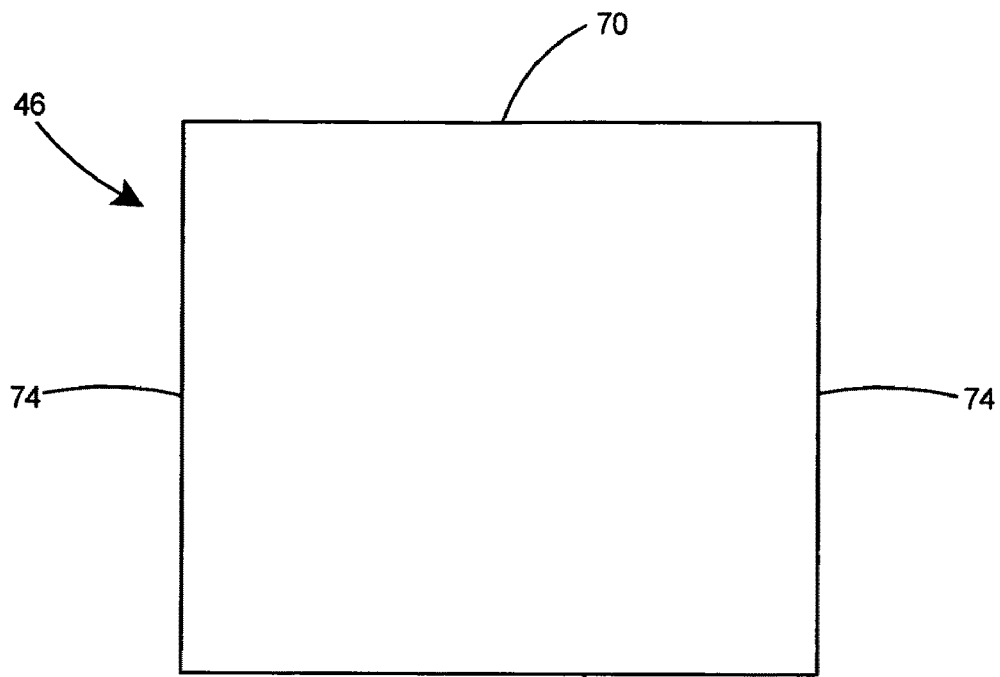
Fig. 9
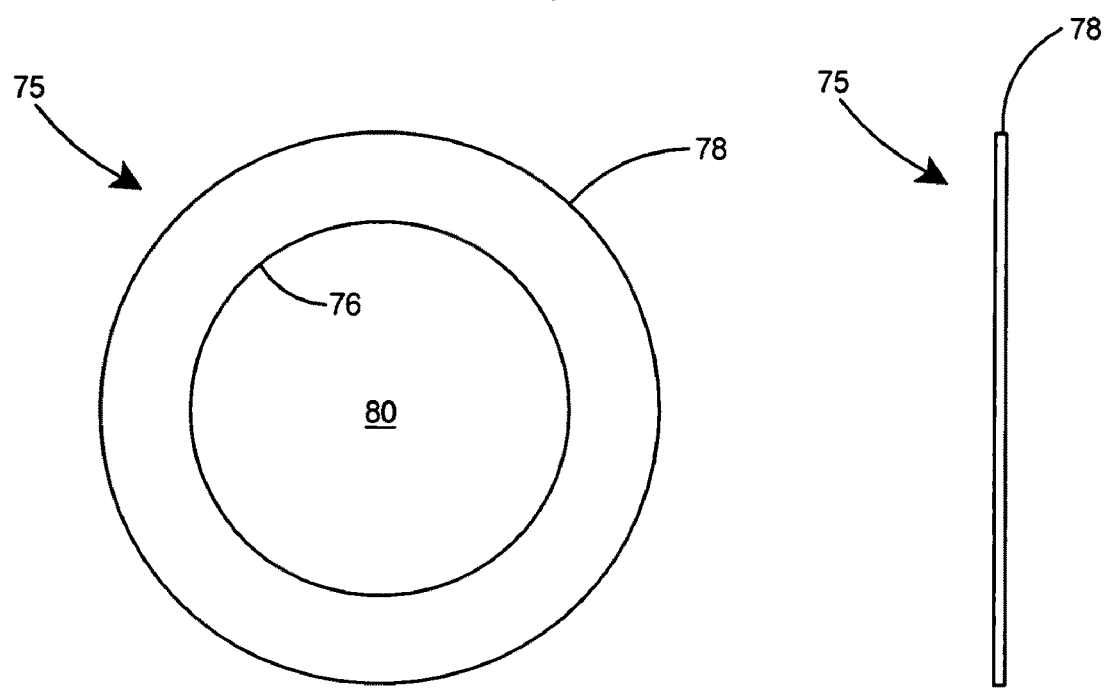
Fig. 10
Fig. 11

US 7,837,842 B1

HYDROGEN GENERATOR AND METHOD FOR THE PRODUCTION OF HYDROGEN

FIELD OF THE INVENTION

This invention relates to generating hydrogen and specifically to an apparatus and method for generating hydrogen using a fuel cell.

BACKGROUND OF THE INVENTION

The production of hydrogen is important as there is now an emphasis to accelerate the establishment of a hydrogen economy to reduce the production of greenhouse gases. Hydrogen production on a small scale will be important for powering vehicles. A common method for small scale production of hydrogen is electrolysis. Electrolysis involves using an external voltage applied to an electrolytic cell to decompose water into hydrogen and hydroxide. The electrolytic cell typically includes an electrolyte and two electrodes. The electrolyte is usually a solution of water in which ions are dissolved. One problem with electrolytic cells is that the electrolyte is typically a corrosive liquid and care must be taken to contain the electrolyte and ensure that the electrolytic cell is safe to handle and operate.

A fuel cell offers a safer alternative to the use of electrolytic cells for the production of hydrogen. The fuel cell can be run in reverse to provide hydrogen fuel. Fuel cells are typically constructed as a fuel cell stacks that include a plurality of fuel cells stacked one upon the other and held in compression with respect to one another. The plurality of stacked fuel cells held in a compressive state form a fuel cell assembly. Each fuel cell includes a cathode layer, an anode layer, and an electrolyte disposed between the cathode layer and the anode layer. The fuel cell assembly requires a substantial amount of compressive force to hold the fuel cells of the assembly together. Prior art fuel cell stack structures typically use rigid end plates to impart and maintain a compressive force on the fuel cell assembly. Typically, ties rods extend through the end plates to impart a compressive force on the end plates and maintain the end plates in a spaced relationship.

Several problems arise as a result of maintaining a typical fuel cell assembly comprised of stacked fuel cells in a compressive relationship. As a result of the high compressive force that must be maintained on the fuel cell assembly, the rigid end plates have a tendency to deflect and not impart a uniform compressive force over the entire fuel cell assembly. The force applied over the central portion of the fuel cell assembly is typically not as great as the force applied to the periphery of the fuel cell assembly. Furthermore, the stacking of a plurality of fuel cells adds complexity to the overall design of the assembly and contributes to the difficulty of maintaining an even compressive force throughout the active area of each fuel cell within the stack.

What is needed therefore, is an apparatus and method for the production of hydrogen that reduces the complexity of the stacked fuel cell assembly and that applies a substantially uniform compressive force along the active area of the fuel cell assembly without requiring excessively thick end plates or the use of augmenting means for applying a uniform compressive force to the central portions of the fuel cells within the assembly. The apparatus for the safe production of hydrogen should be compact enough to be easily mounted singly or in a series configuration on a conventional vehicle with an internal combustion engine in order to provide an alternative fuel source for the vehicle and alternatively combined in any number of modules to provide commercial quantities for use in supplying hydrogen to power fuel cells. The apparatus for production of hydrogen could also be used in homes or businesses to supply hydrogen in place of natural gas.

SUMMARY OF THE INVENTION

The present invention is directed to an apparatus and method for generating hydrogen. The hydrogen generator of the present invention includes a cylindrical sidewall or body and two end plates defining a cavity therein. A plurality of elements are disposed within the cavity including an outer gasket, an outer electrode, a proton exchange membrane, an inner electrode, and an inner gasket. A bladder is disposed within the body and inside the elements. A rubber gasket and an end plate are disposed at each end of the body and are held in a rigid spaced and compressed relationship with respect to the body. A water and oxygen port extends from the inner conductor layer through a first end plate. A hydrogen port extends through the body from the outer side of the proton exchange member. A water inlet port extends from a second end plate at one end of the fuel cell to inner side of the proton exchange membrane. A first terminal is connected to the outer conductor layer and a second terminal is connected to the inner conductor layer. An inflation tube extends from the bladder through the first end plate.

OBJECTS AND ADVANTAGES

Several advantages are achieved with the hydrogen generator apparatus and method of the present invention, including:

(1) The hydrogen generator provides a simple and compact apparatus for producing hydrogen from water.
(2) The fuel cell based hydrogen generator of the present invention is inherently safer than prior art electrolyzers as it eliminates the use of corrosive electrolytes.
(3) The compact size of the hydrogen generator enables it to be easily mounted on a vehicle to provide hydrogen fuel source to power the vehicle.
(4) The hydrogen apparatus and method require only water and a voltage source to produce hydrogen fuel.
(5) Only modest input voltage is required to produce hydrogen with the hydrogen apparatus and method of the present invention.
(6) The voltage source can be supplied from either a battery or solar cells.
(7) The design of the hydrogen generator provides good contact between the proton exchange membrane and the electrodes.
(8) The hydrogen generator includes a cylindrical body and a central bladder that ensures even pressure and contact between the proton exchange membrane and the electrodes.

These and other objects and advantages of the present invention will be better understood by reading the following description along with reference to the drawings.

DESCRIPTION OF THE DRAWINGS

FIG. 9 is a plan view of a proton exchange membrane that forms a portion of the hydrogen generator of FIG. 6.

FIG. 10 is a plan view of a top and bottom gasket that forms a portion of the hydrogen generator of FIG. 6.

FIG. 11 is a side view of the top and bottom gasket of FIG. 10.

Figure 1:
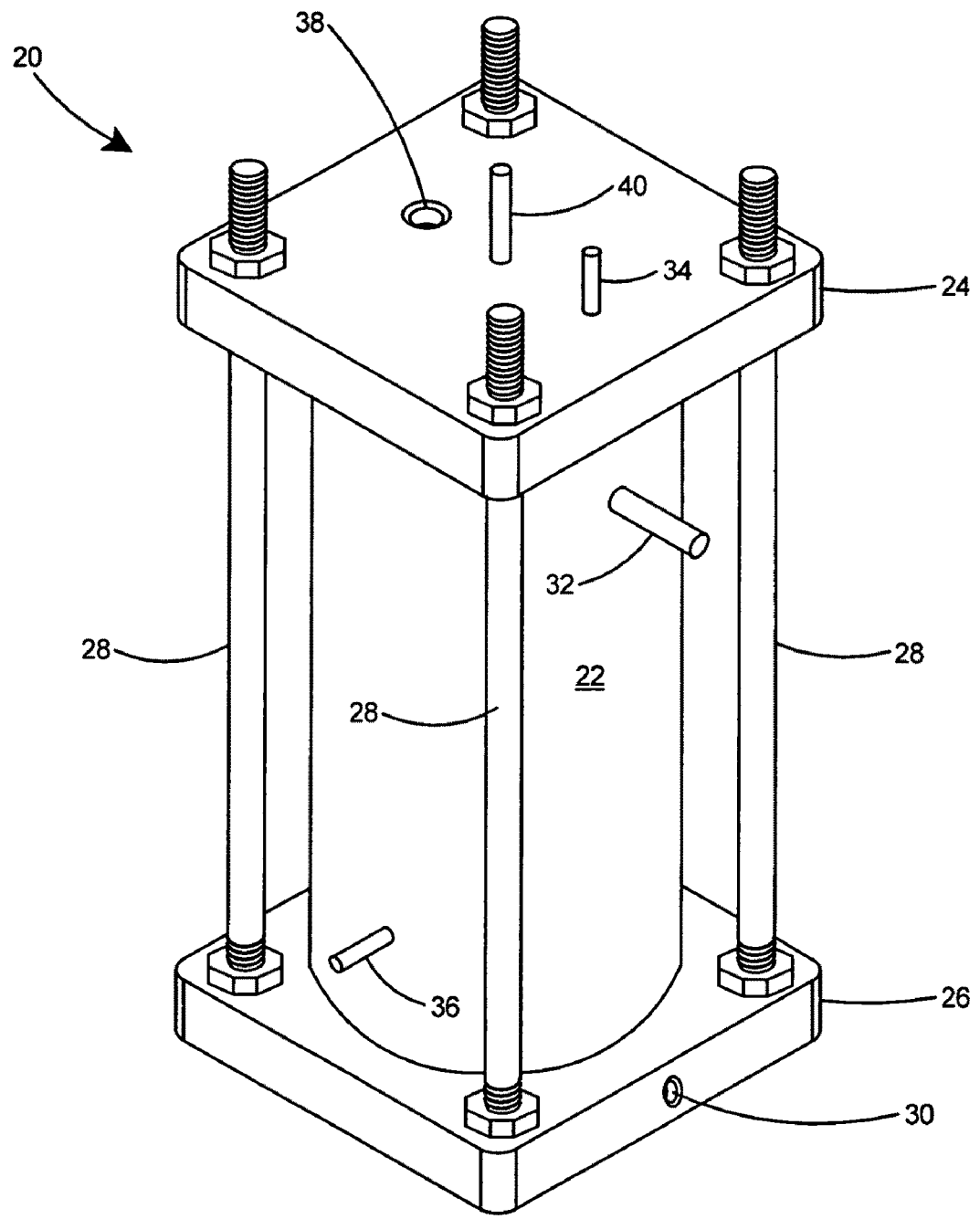
FIG. 1 is a perspective view of the hydrogen generator of the present invention.

| 22) INDEX TO REFERENCE NUMERALS IN DRAWINGS | |
|---|---|
| 20 | hydrogen generator, preferred embodiment |
| 22 | cylindrical sidewall or body |
| 24 | top end plate |
| 26 | bottom end plate |
| 28 | elongated bolt |
| 30 | water inlet port |
| 32 | hydrogen outlet tube |
| 34 | positive electrical terminal |
| 36 | negative electrical terminal |
| 38 | oxygen/water outlet port |
| 40 | inflator tube |
| 42 | outer gasket |
| 44 | outer electrode |
| 46 | proton exchange membrane |
| 48 | inner electrode |
| 50 | inner gasket |
| 52 | bladder |
| 54 | interior wall or inner wall of body |
| 56 | top edge of inner gasket |
| 58 | bottom edge of inner gasket |
| 60 | side edge of inner gasket |
| 62 | inner periphery |
| 63 | opening in inner gasket |
| 64 | top edge of electrode |
| 66 | bottom edge of electrode |
| 68 | side edge of electrode |
| 70 | top edge of membrane |
| 72 | bottom edge of membrane |
| 74 | side edge of membrane |
| 75 | end gasket |
| 76 | inner periphery of end gasket |
| 78 | outer edge of end gasket |
| 80 | opening in end gasket |
| 82 | cavity |
| 84 | aperture in sidewall |
| 86 | first bore in top end plate |
| 88 | second bore in top end plate |
| 89 | non-grooved portion of inner wall |
| 90 | groove in sidewall or body |
| 91 | power source |
| 92 | oxygen storage/water accumulator |
| 93 | water pump |
| 94 | hydrogen storage tank |
| 95 | vehicle |
| 96 | radiator |
| 97 | cooling water inlet |
| 98 | cooling water outlet |

DETAILED DESCRIPTION OF THE INVENTION

With reference to FIG. 1 there is shown a preferred embodiment of a hydrogen generator 20 that includes a rigid cylindrical body or sidewall 22 with a rigid top end plate 24 and a rigid bottom end plate 26 closing off the two ends of the sidewall 22. Several elongated bolts 28 extend through the end plates 24, 26 and secure them tightly against the sidewall 22. The hydrogen generator 20 includes a water inlet port 30 in the bottom end plate 26 and a hydrogen outlet tube 32 extending from the sidewall 22. The hydrogen generator 20 includes a positive electrical terminal 34 extending through the top end plate 24 and a negative electrical terminal 36 extending through the sidewall 22. The electrical terminals 34 and 36 are preferably constructed of stainless steel or titanium. The top end plate 24 additionally includes an oxygen/water outlet 38 and an inflator tube 40 extending there from.

Figure 5:
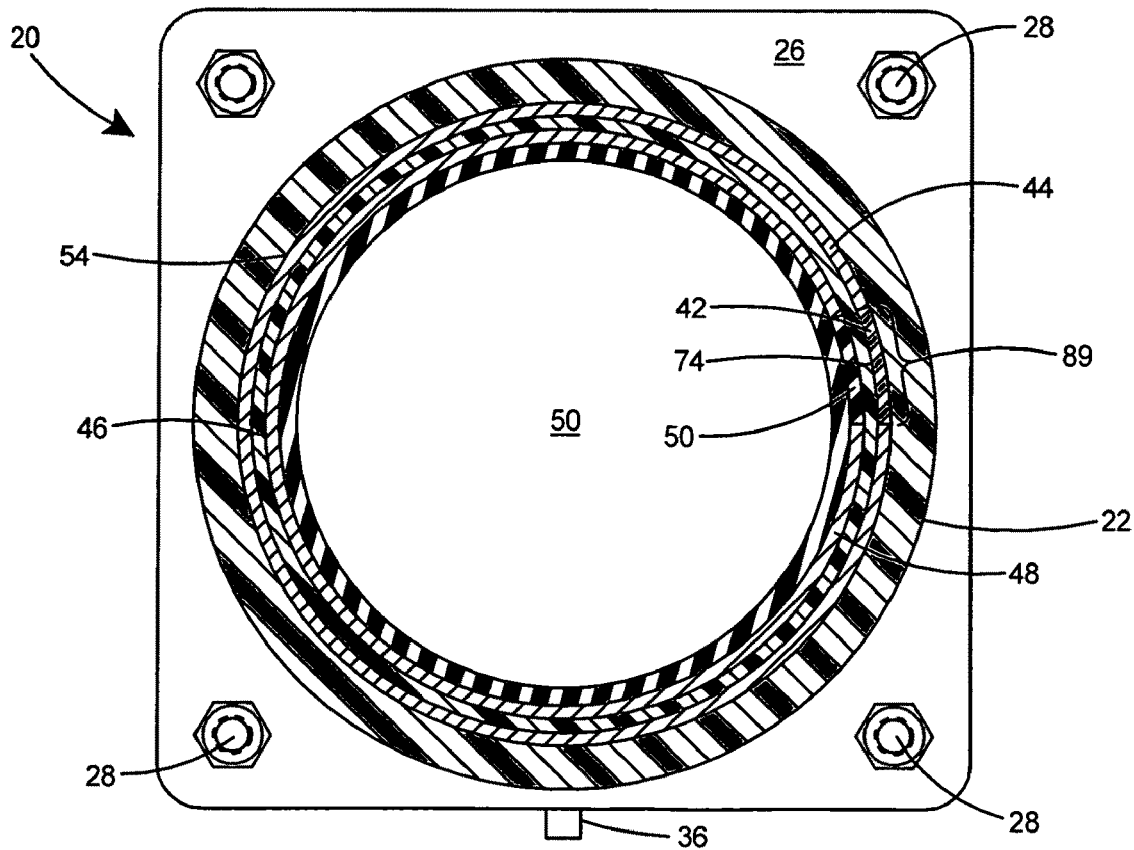
FIG. 5 is a sectional view of the hydrogen generator taken along line 5-5 of FIG. 3.

With reference to FIG. 5, the interior of the hydrogen generator 20 includes several flexible layers arranged within the sidewall 22 including an outer gasket 42, an outer electrode 44, a proton exchange membrane 46, an inner electrode 48, and an inner gasket 50. A bladder 52 is disposed within the sidewall 22 and, when inflated as shown in FIG. 5, exerts pressure against the various flexible layers and presses them into firm contact with one another and into firm engagement with the interior wall 54 of the cylindrical sidewall 22. A bladder 52 such as described herein is available from automotive suppliers such as Air Lift Company of Lansing, Mich.

Figure 7:
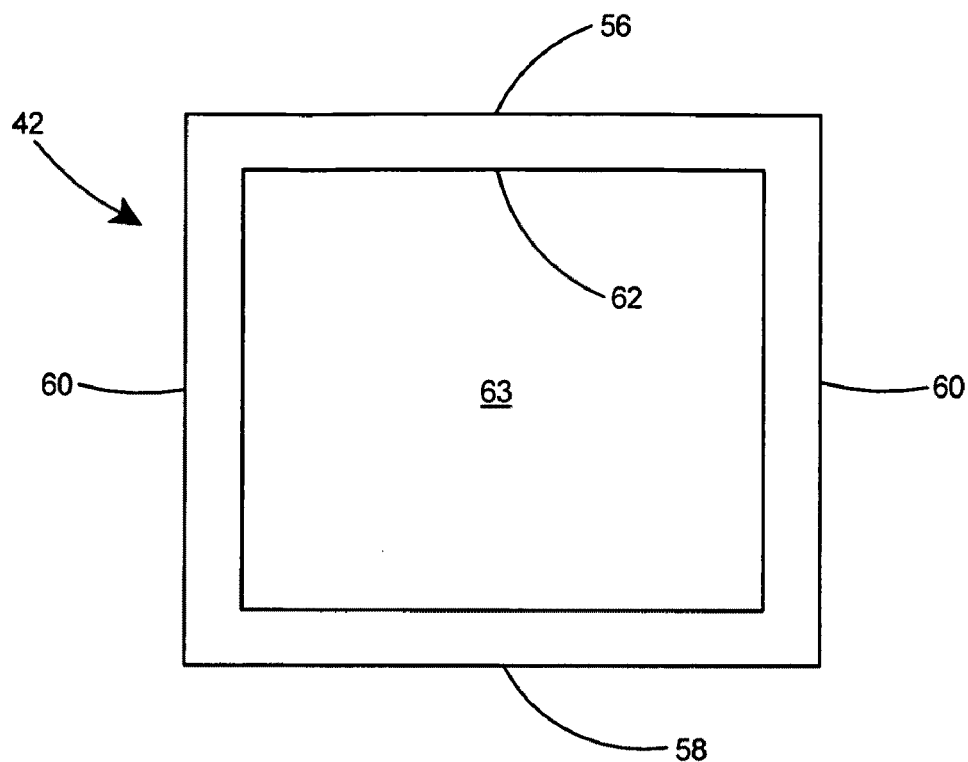
FIG. 7 is a plan view of a rubber gasket that forms a portion of the hydrogen generator of FIG. 6.

Referring to FIG. 7, the outer 42 and inner gaskets 50, of which the outer gasket 42 is shown, are formed from a sheet of elastomeric material such as natural or synthetic rubber and are stamped or cut in the shape of a picture frame shape. The outer 42 and inner gaskets 50 include a top edge 56, bottom edge 58, side edges 60, an inner periphery 62, and an opening 63 therein.

Figure 8:
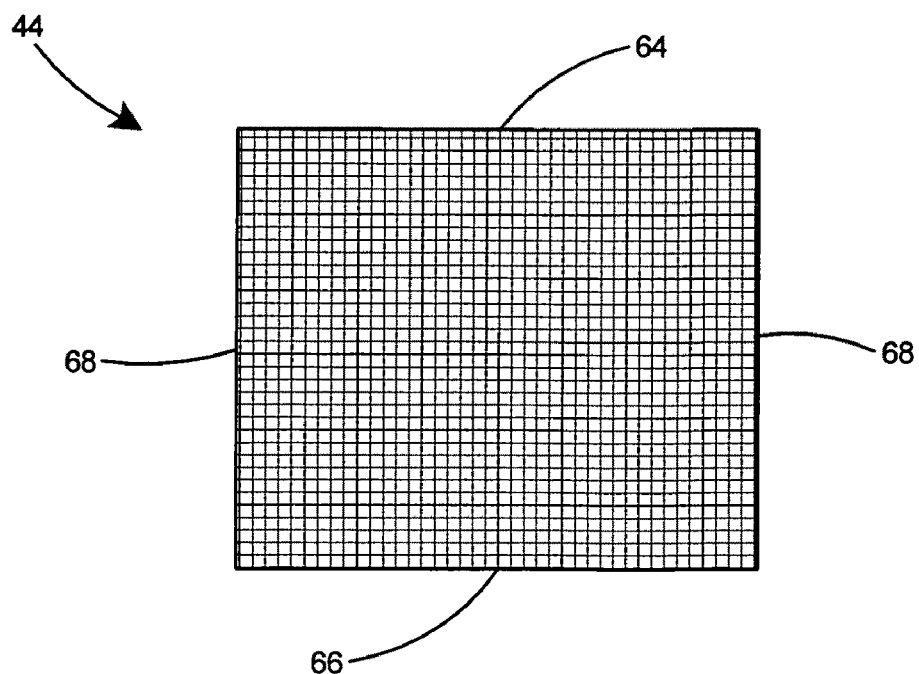
FIG. 8 is a plan view of a mesh electrode layer that forms a portion of the hydrogen generator of FIG. 6.

As shown in FIG. 8, the outer electrode 44 and inner electrode 48, of which the outer electrode 44 is shown, are cut or stamped from mesh or expanded metal sheet material in a rectangular shape and are preferably constructed of titanium mesh. Each electrode includes a top edge 64, bottom edge 66, and side edges 68. The length and width of outer 44 and inner electrodes 48 are cut to a size to fit within the opening 63 of the outer 42 and inner 50 gaskets respectively and substantially fill the inner periphery 62 of the respective gasket.

FIG. 9 depicts the proton exchange membrane 46, which is cut in a rectangular shape for use in the hydrogen generator of the present invention. The proton exchange membrane 46 is preferably a HYDRION® membrane available from Ion Power, Inc. of New Castle, Del. The HYDRION® membrane is constructed of NAFION®, a product available from DuPont of Wilmington, Del. and includes a coating of platinum and iridium catalysts. The proton exchange membrane includes a top edge 70, bottom edge 72, and side edges 74.

With reference to FIGS. 10 and 11, there is shown an end gasket 75 that forms a portion of the hydrogen generator of the present invention. The end gasket 75, two of which are used, are stamped or cut from a sheet of elastomeric material such as natural or synthetic rubber and are shaped in the form of an annulus as shown in FIG. 10. The end gasket 75 includes a circular inner periphery 76, a circular outer edge 78, and an opening 80 therein. Most preferably, the end gasket 75 is constructed of ethylene propylene di-monomer (EPDM) synthetic rubber.

Figure 12:
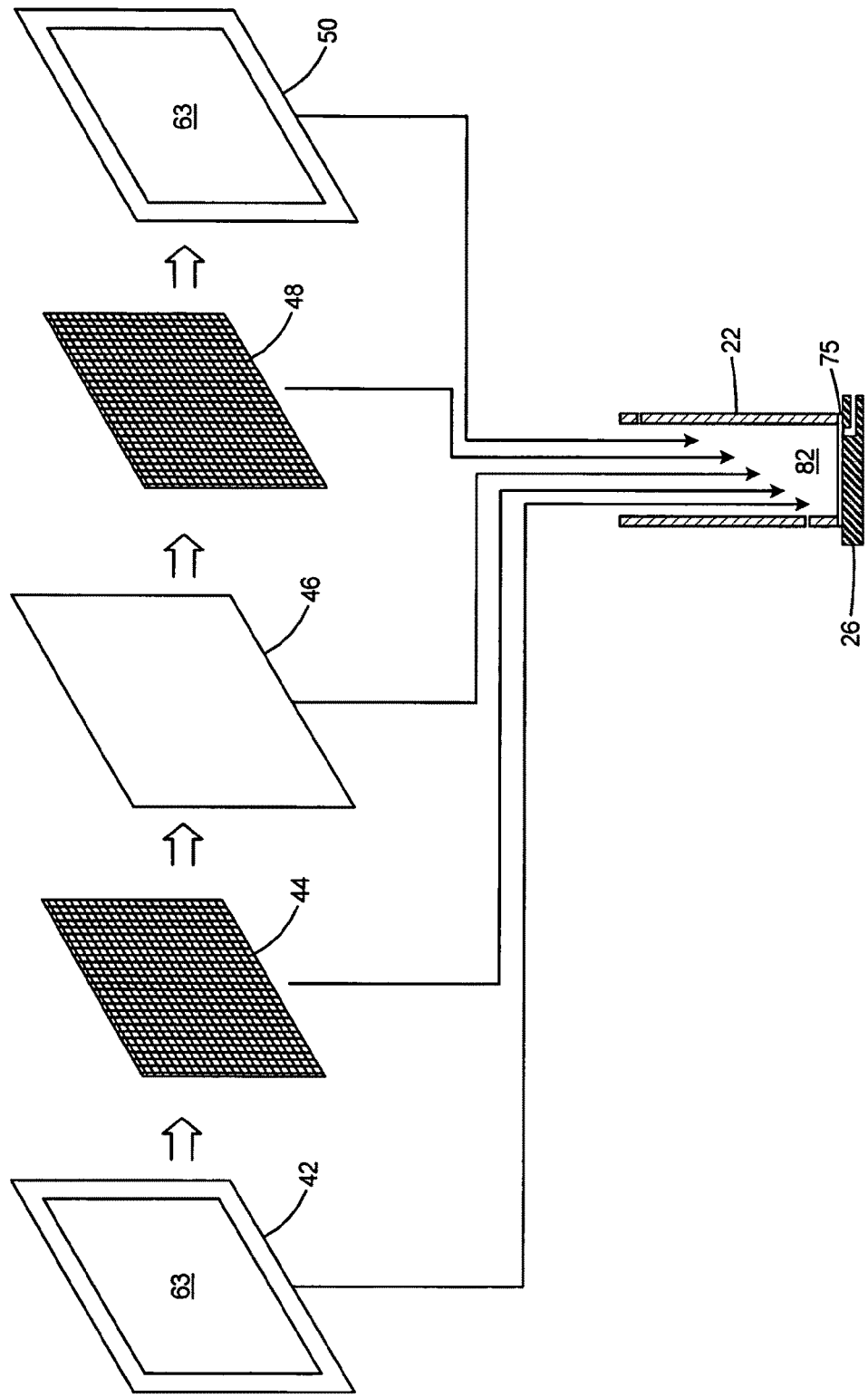
FIG. 12 is a schematic depicting the sequence and arrangement of inserting internal components in constructing the hydrogen generator of the present invention.

Referring to FIG. 12, the preferred embodiment of the hydrogen generator 20 of the present invention is constructed by providing a bottom end plate 26, an annulus-shaped end gasket 75, and a sidewall 22 as shown. The end gasket 75 is inserted on the bottom end plate 26 and the sidewall 22 placed there on. For illustration of the sequence of constructing a hydrogen generator 20 according to the present invention, some of the various internal components are depicted in their original or unbiased shape. The outer gasket 42, outer electrode 44, proton exchange membrane 46, inner electrode 48, and inner gasket 50 are each rolled into a cylindrical shape and then inserted into the cavity 82 bounded by the sidewall 22 and end plate 26. The sequence of insertion of the internal components includes inserting the outer gasket 42, the outer electrode 44, the proton exchange membrane 46, the inner electrode 48, and finally the inner gasket 50 into the cavity 82. The outer electrode 44 fits within and substantially fills the opening 63 within outer gasket 42 and the inner electrode 48 fits within and substantially fills the opening 63 within inner gasket 50.

Figure 3:
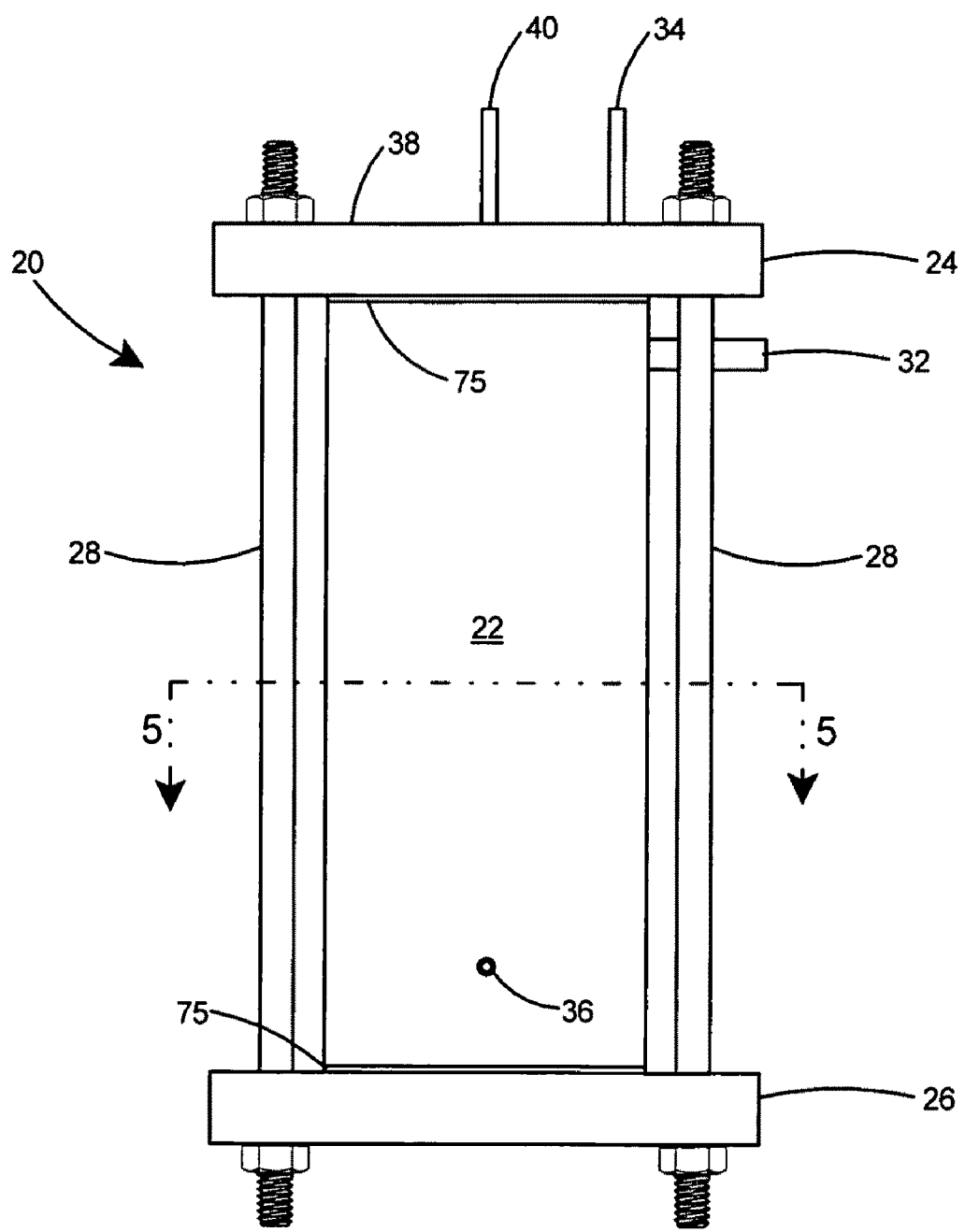
FIG. 3 is a side view of the hydrogen generator of FIG. 1.
Figure 4:
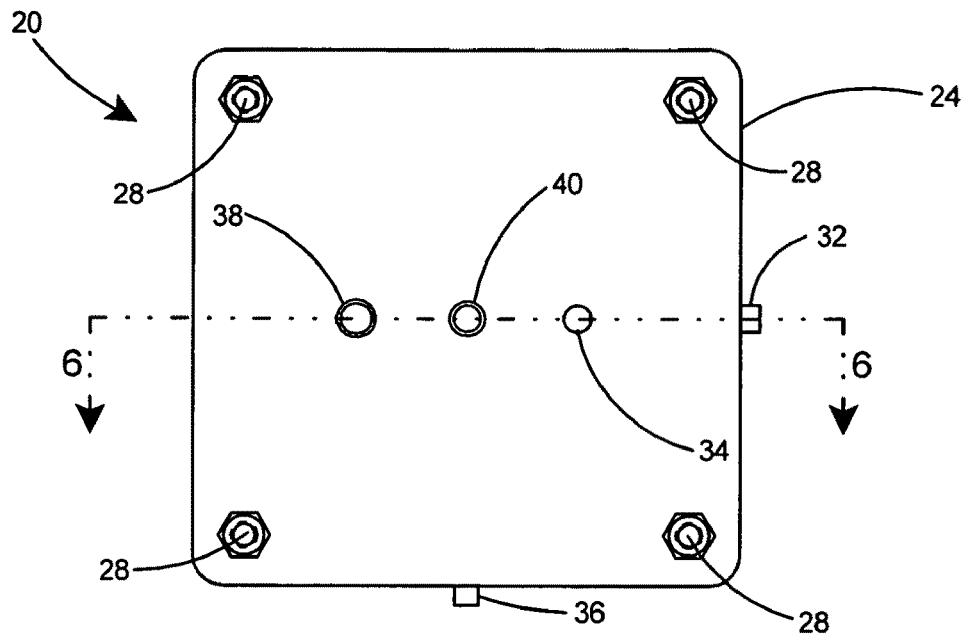
FIG. 4 is a top view of the hydrogen generator of FIG. 3.
Figure 13:
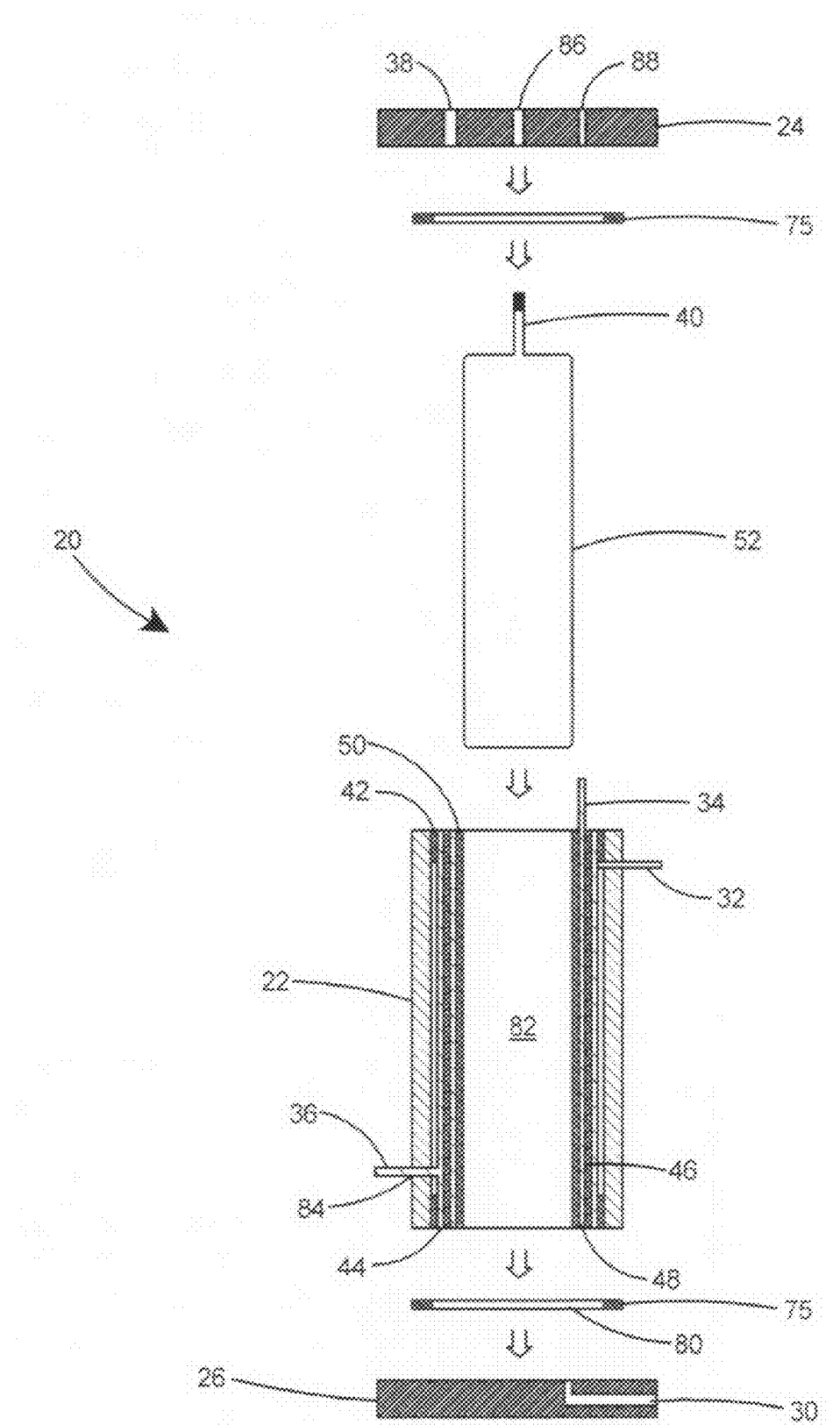
FIG. 13 is an exploded perspective view of the hydrogen generator including the internal bladder and end plates exploded away from the cylindrical body.

With reference to FIG. 13, there is shown an exploded perspective view of the hydrogen generator 20 including the internal bladder 52 and end plates 24 and 26 exploded away from the sidewall 22. Although the bottom end plate 26 and end gasket 75 are shown exploded away from the sidewall 22, as described in the previous paragraph, the bottom end plate 26 and end gasket 75 are first placed in contact with the sidewall or body 22. As the outer electrode 44 is placed in the cavity 82, the negative electrical terminal 36 is inserted through aperture 84 in the sidewall 22 and secured to the outer electrode 44 by welding, soldering or other conventional means to establish good electrical contact between the negative electrical terminal 36 and the outer electrode 44. In a similar manner, prior to inserting the inner electrode 48 into the cavity 82, positive electrical terminal 34 is secured to the inner electrode 48, by welding, soldering or other conventional means, to establish good electrical contact between positive electrical terminal 34 and the inner electrode 48. After all of the components are inserted within the cavity 82 with their bottom edges in contact with the bottom end plate 26, bladder 52 is inserted within the cavity 82. A second end gasket 75 is then inserted over the top of the cylindrical body 22. The top end plate 24, which includes a first bore 86 and second bore 88 therein, is then placed over the top of the second end gasket 75 and cylindrical body 22 in such a manner that inflator tube 40 of bladder 52 and positive electrical terminal 34 extend through the first bore 86 and second bore 88 respectively. As shown in FIG. 3, elongated bolts 28 are then secured through both end plates 24 and 26 and tightened to compress both end gaskets 75 against the top and bottom ends of the cylindrical body 22 and seal the hydrogen generator.

Figure 6:
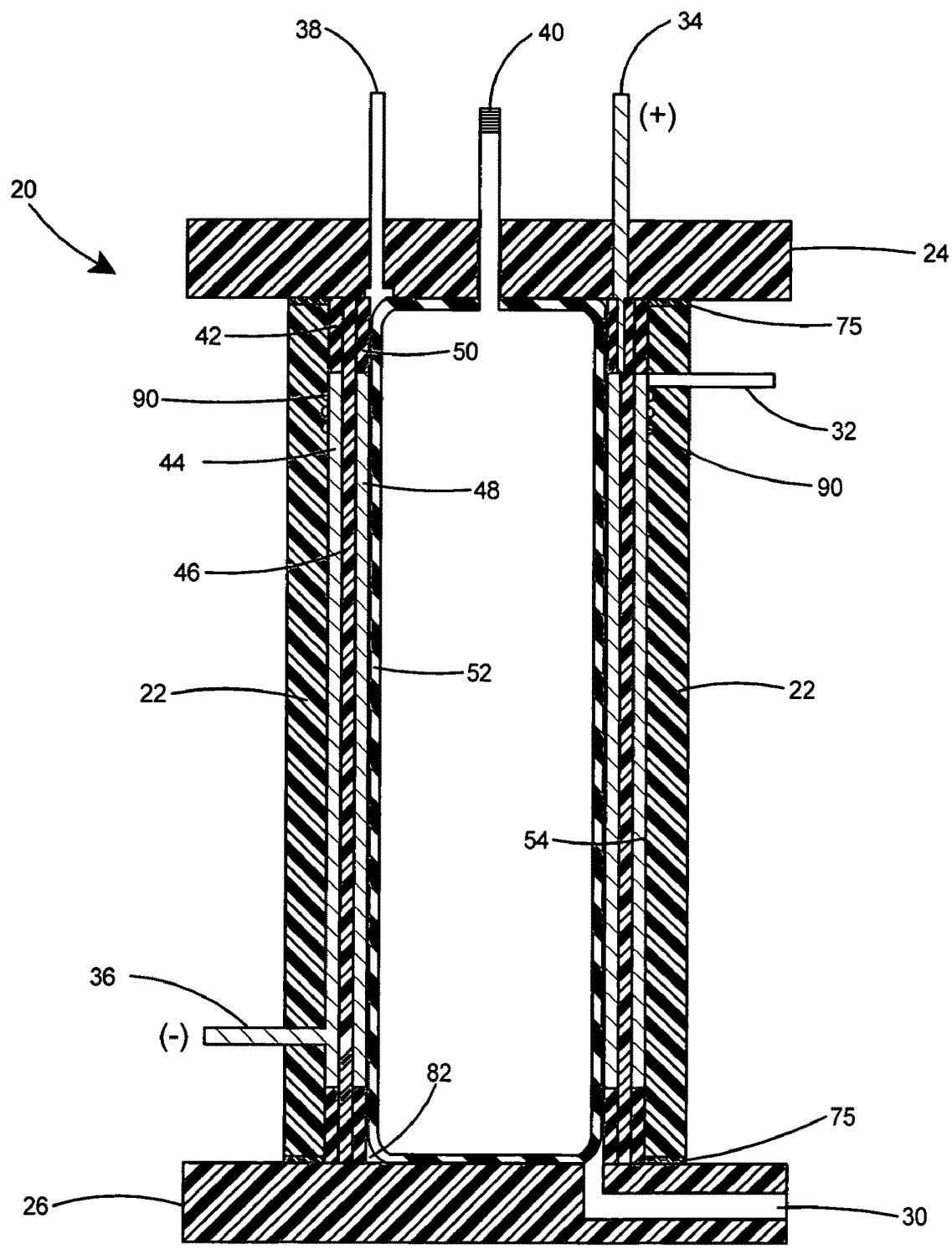
FIG. 6 is a sectional view of the hydrogen generator taken along line 6-6 of FIG. 4.

Reference is made to FIG. 6 for a description of the operation of the hydrogen generator of the present invention. For ease of explanation, FIG. 6 depicts the hydrogen generator 20 without the elongated bolts 28. In order to better illustrate the operation of the present invention, the various elements within the hydrogen generator 20, including the outer gasket 42, outer electrode 44, proton exchange membrane 46, inner electrode 48, inner gasket 50, and bladder 52 are depicted substantially thicker than actual. After all the internal components are inserted into the cavity 82 and the end plates 24 and 26 are secured, air, nitrogen, or a non-compressible fluid is introduced through inflator tube 40 to pressurize the bladder 52. The bladder 52 is pressurized until it has exerted pressure against all the surrounding components and the components are pressed tightly together and held securely against the inner wall 54 of the cylindrical body 22. Preferably, the bladder 52 is pressurized to between 50 and 100 psi. The function of the outer gasket 42 and inner gasket are to seal around the periphery of the top edges, bottom edges, and side edges of the proton exchange member 46. Thus distilled water introduced at water inlet port 30 flows around the outer surface of the bladder 52 and upward through the inner mesh electrode 48. As the distilled water flows upward in contact with the inner electrode 48, the applied voltage to electrical terminal 34 creates a positive charge on the inner side of the proton exchange membrane 46 while electrical terminal 36 creates a negative charge on the outer side of the proton exchange membrane 46. At the inner electrode or anode 48, the platinum and iridium catalyst on the proton exchange membrane 46 causes the $H_2O$ molecules to split into positive hydrogen ions ($H^+$), and negatively charged electrons. The proton exchange membrane 46 allows only the positively charged hydrogen ions to pass through it to the outer electrode or cathode 44. At the cathode the hydrogen ions combine with electrons to form hydrogen gas. Thus, in operation distilled water enters the hydrogen generator at the water inlet port 30, oxygen and water exit at the oxygen/water outlet port 38 and hydrogen exits through hydrogen outlet tube 32. As shown in FIG. 6, grooves 90 are provided around a substantial portion of the inner periphery of the cylindrical sidewall 22 in close proximity to the hydrogen outlet tube 32 to provide space for accumulating hydrogen gas and channeling it toward the hydrogen outlet tube 32. Preferably, the grooves 90 are at least 0.031 inch in depth. As shown in FIG. 5, a portion 89 of the inner wall 54 is left non-grooved to provide a smooth surface for the outer gasket 42 and inner gasket 50 to create a surface for sealing around the side edges 74 of the proton exchange membrane 26. The side edges 74 of the proton exchange membrane 26 are aligned with the non-grooved portion 89 of the inner wall 54.

Figure 2:
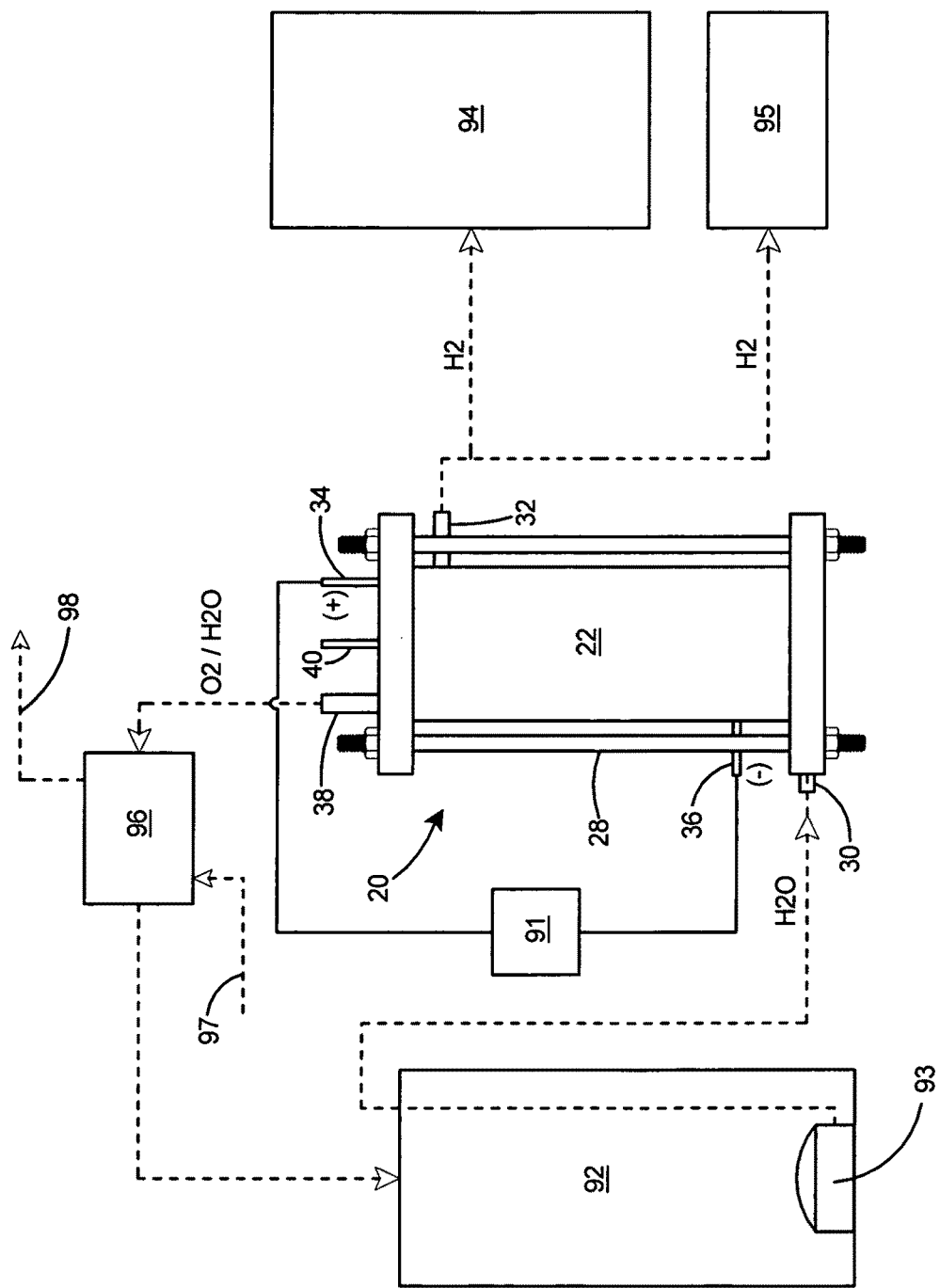
FIG. 2 is a schematic depicting a hydrogen generation system utilizing the hydrogen generator of the present invention.

With reference to FIG. 2 there is shown a schematic depicting a hydrogen generation system utilizing the hydrogen generator of the present invention. In the hydrogen generator 20, distilled water is fed into water inlet port 30 and a power source 91 is connected to electrical terminals 34 and 36. The power source 91 is preferably DC voltage and can be provided by a battery or solar panel (not shown). The voltage applied to the electrical terminals 34 and 36 is preferably between 1.5 and 2.0 volts. A voltage in this range enables the proton exchange membrane to operate at a high efficiency and produce approximately 7.5 liters per minute of hydrogen from a proton exchange membrane with an area of 80 square inches. Distilled water is stored in an oxygen storage/water accumulator tank 92 and a pump 93 propels the distilled water to the generator 20. Inside the hydrogen generator 20 electricity and water are combined to create oxygen and hydrogen. Hydrogen exits the generator 20 through hydrogen outlet tube 32 and oxygen and water exit through the oxygen/water outlet port 38. The hydrogen can be accumulated in a hydrogen storage tank 94 or be sent to the fuel feed of an internal combustion engine in a vehicle 95 as shown. The oxygen and water exit the hydrogen generator 20 at oxygen/water outlet port 38 and are cooled in a radiator 96 that includes a cooling water inlet 97 and cooling water outlet 98.

With reference to FIG. 6, in the preferred embodiment of the hydrogen generator the sidewall or body 22 is preferably constructed of plastic or metal. Suitable plastics for constructing the body 22 include polypropylene, polyethylene, polyvinyl chloride (PVC), acrylonitrile-butadiene styrene (ABS), and polycarbonate. Suitable metals include aluminum and stainless steel. Most preferably the body 22 is formed of clear polyvinyl chloride. The end plates 24 and 26 are preferably constructed of a material that is an electrical insulator. More preferably the end plates 24 and 26 are constructed of plastic.

Suitable plastics include polypropylene, polyethylene, polyvinyl chloride (PVC), acrylonitrile-butadiene styrene (ABS), and polycarbonate. Most preferably the end plates 24 and 26 are constructed of polycarbonate. As one example of a preferred embodiment, the cylindrical body 22 is formed from a 10-inch long piece of 4-inch Schedule 80 PVC pipe.

Most preferably the outer electrode 44 and inner electrode 48 are constructed of titanium mesh. The positive electrical terminal 34 and negative electrical terminal 36 are preferably constructed of titanium or stainless steel. Most preferably, the outer gasket 42 and inner gasket 50 are constructed of ethylene propylene di-monomer (EPDM) rubber.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A hydrogen generator comprising:
   a body including an inner wall and two ends;
   a first end plate and a second end plate secured against said ends of said body and defining a cavity therein;
   said cavity including several elements therein including in order from said body inward an outer gasket, an outer electrode, a proton exchange membrane, an inner electrode, and an inner gasket;
   a bladder disposed within said cavity inward of said elements, said bladder inflated thereby compressing said elements into intimate contact with one another and against said inner wall of said body;
   a first electrical terminal secured to said outer electrode and extending through said body;
   a second electrical terminal secured to said inner electrode and extending through said first end plate;
   a water inlet port in said second end plate;
   a hydrogen outlet port extending from said inner wall through said body; and
   an oxygen and water outlet port extending through said first end plate.

2. The hydrogen generator of claim 1 wherein said outer gasket and said inner gasket are formed from a flat elastomeric sheet in the shape of a picture frame and are formed into a cylindrical shape for insertion into said cavity.

3. The hydrogen generator of claim 1 wherein
   said outer electrode and said inner electrode are electrically conductive; and
   said outer electrode and said inner electrode are formed from rectangular shaped metal mesh and formed into a cylindrical shape for insertion into said cavity.

4. The hydrogen generator of claim 1 wherein said proton exchange membrane is rectangular shaped and formed into a cylindrical shape for insertion into said cavity.

5. The hydrogen generator of claim 4 wherein said proton exchange membrane is a HYDRION® membrane including a NAFION® base member with a coating of platinum and iridium catalysts.

6. The hydrogen generator of claim 1 including
   a power source connected between said first electrical terminal and said second electrical terminal; and
   said power source providing a DC voltage to said first electrical terminal and said second electrical terminal.

7. The hydrogen generator of claim 2 wherein the material of construction of said outer gasket and said inner gasket is ethylene propylene di-monomer.

8. The hydrogen generator of claim 3 wherein said outer electrode and said inner electrode are formed of titanium mesh.

9. The hydrogen generator of claim 1 wherein said first end plate and said second end plate are formed of material that is an electrical insulator.

10. The hydrogen generator of claim 1 wherein
    said body is of cylindrical shape;
    said inner wall of said body includes grooves therein extending around a portion of the circumference of said inner wall; and
    said grooves are in close proximity to said hydrogen outlet port.

11. The hydrogen generator of claim 1 including an annulus shaped end gasket disposed between each of said end plates and said body.

12. The hydrogen generator of claim 1 including
    a fastening arrangement for securing said end plates to said body; and
    said fastening arrangement including a plurality of elongated bolts extending through said end plates.

13. The hydrogen generator of claim 1 wherein the material of construction of said body is selected from the group including polypropylene, polyethylene, polyvinyl chloride (PVC), acrylonitrile-butadiene styrene (ABS), polycarbonate, and metal.

14. The hydrogen generator of claim 13 wherein
    said body is constructed of polyvinyl chloride; and
    said end plates are constructed of polycarbonate.

15. The hydrogen generator of claim 11 wherein the material of construction of said end gasket is ethylene propylene di-monomer.

16. A method of producing hydrogen including:
    providing a body with an inner wall and two ends, two end plates, and a fastening arrangement for securing said end plates at said ends of said body and forming a cavity therein;
    inserting within said cavity several elements therein including in order from said body inward an outer gasket, an outer electrode, a proton exchange membrane, an inner electrode, and an inner gasket;
    inserting within said cavity a bladder inward of said elements;
    inflating said bladder thereby compressing said elements into intimate contact with one another and against said inner wall of said body;
    securing a first electrical terminal to said outer electrode and extending said first electrical terminal through said body;
    securing a second electrical terminal to said inner electrode and extending said second electrical terminal through said first end plate;
    providing a water inlet port in said second end plate;
    providing a hydrogen outlet port extending from said inner wall through said body;
    providing an oxygen and water outlet port extending through said first end plate;
    connecting a DC voltage across said first and second electrical terminals; and
    pumping distilled water into said water inlet port thereby creating hydrogen gas exiting said hydrogen generator at said hydrogen outlet port.

17. The method of claim 16 wherein said
    said body is a cylindrical shape and said end plates are formed of material that is an electrical insulator;

said body is constructed of polyvinyl chloride; and said end plates are constructed of polycarbonate.

18. The method of claim 16 wherein said outer and inner electrodes are electrically conductive; and said outer and inner electrodes are formed from rectangular shaped metal mesh and formed into a cylindrical shape for insertion into said cavity.

19. The method of claim 16 wherein said inner wall of said body includes grooves therein extending around a portion of the circumference of said inner wall; and said grooves are in close proximity to said hydrogen outlet port.

20. The method of claim 16 wherein said bladder is pressurized to a pressure of between 50 and 100 psi.

* * * * *

UNITED STATES PATENT AND TRADEMARK OFFICE
CERTIFICATE OF CORRECTION

| | | |
|---|---|---|
| PATENT NO. | : 7,837,842 B1 | Page 1 of 1 |
| APPLICATION NO. | : 12/584617 | |
| DATED | : November 23, 2010 | |
| INVENTOR(S) | : Fred T. Mayers, Sr. and Fred T. Mayers, Jr. | |

It is certified that error appears in the above-identified patent and that said Letters Patent is hereby corrected as shown below:

Title Page, item [75] Inventors, change "Chester" to --Richmond-- on line 2 and change "Chester" to --Richmond-- on line 3.

Signed and Sealed this
Fifth Day of April, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,837,842 B1 | Page 1 of 1 |
| APPLICATION NO. | : 12/584617 | |
| DATED | : November 23, 2010 | |
| INVENTOR(S) | : Fred T. Mayers, Sr. and Fred T. Mayers, Jr. | |

It is certified that error appears in the above-identified patent and that said Letters Patent is hereby corrected as shown below:

Title page, item (75), inventors: change "Chester" to --Richmond-- on line 2 and change "Chester" to --Richmond-- on line 3.

In the Inventors section on the first page of the patent change "23831" to --23228-- on line 2 and change "23831" to --23228-- on line 4.

Signed and Sealed this
Twelfth Day of April, 2011

David J. Kappos
*Director of the United States Patent and Trademark Office*